No. 729,664. PATENTED JUNE 2, 1903.
E. G. RICHARDS.
ELECTRIC MOTOR.
APPLICATION FILED JUNE 30, 1897.
NO MODEL.
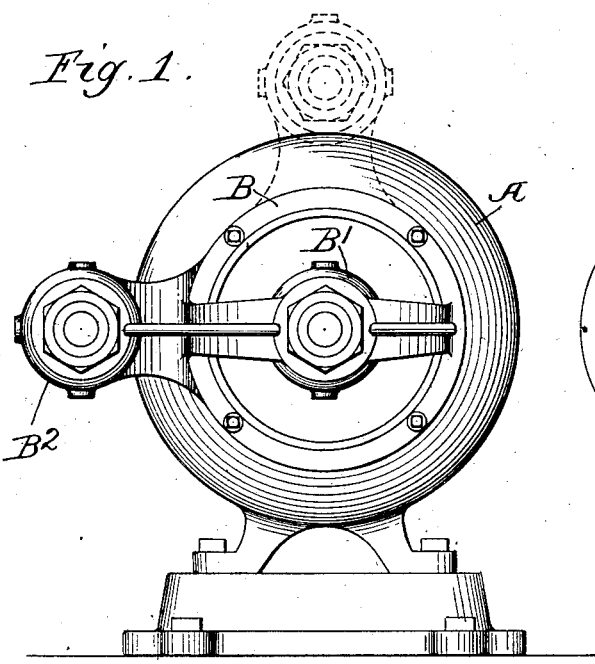
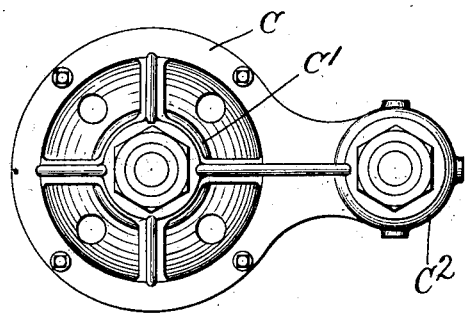
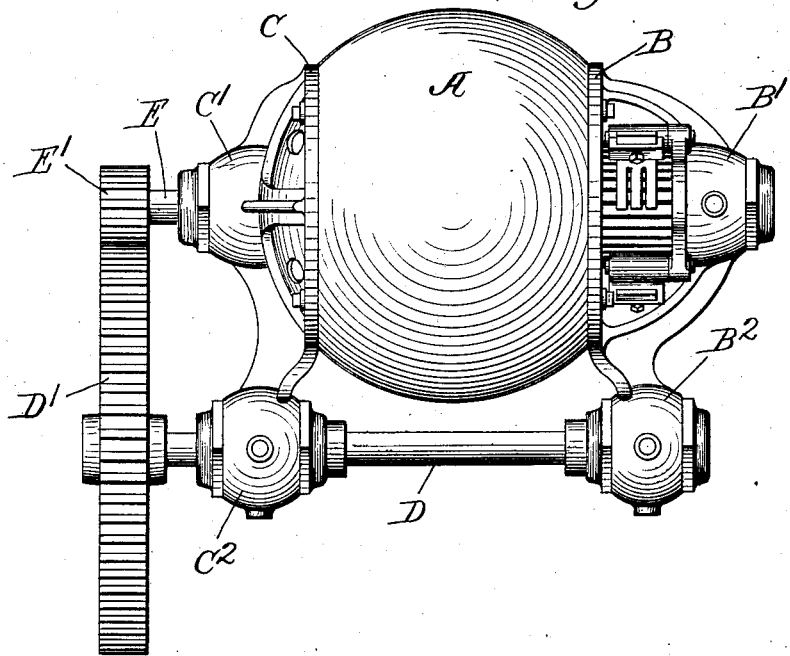
Witnesses.
Edward T. Wray
Homer L. Craft
Inventor.
Edgar G. Richards.
by Parker & Carter
Attorneys.

No. 729,664. Patented June 2, 1903.

UNITED STATES PATENT OFFICE.

EDGAR G. RICHARDS, OF MADISON, WISCONSIN, ASSIGNOR TO THE NORTHERN ELECTRICAL MANUFACTURING COMPANY, OF MADISON, WISCONSIN, A CORPORATION OF WISCONSIN.

ELECTRIC MOTOR.

SPECIFICATION forming part of Letters Patent No. 729,664, dated June 2, 1903.

Application filed June 30, 1897. Serial No. 642,904. (No model.)

*To all whom it may concern:*

Be it known that I, EDGAR G. RICHARDS, a citizen of the United States, residing at Madison, Dane county, State of Wisconsin, have invented certain new and useful Improvements in Electric Motors, of which the following is a specification.

My invention relates to motors, and has for its object to provide a new and improved motor, of which the following is a description, reference being had to the accompanying drawings, wherein—

Figure 1 is an end elevation of a motor embodying my invention. Fig. 2 is a plan view of the device shown in Fig. 1. Fig. 3 is a view of one of the end pieces of the motor-frame.

Like letters refer to like parts throughout the several figures.

The motor proper is surrounded by a suitable frame comprising the central piece A, provided with the removable end pieces B and C. The central piece A is adapted to be attached to some suitable supporting device. The end pieces B and C are provided with the usual bearings B' C' for the shaft of the motor and are also provided with the projecting pieces $B^2 C^2$, rigidly connected therewith. Said projecting pieces are each formed with a suitable bearing for the driven shaft D. In the drawings I have shown the projecting parts as cast integral with the end pieces, and I have also shown the motor-shaft E as provided with the pinion E', engaging the gear D' on the driven shaft D. It will be seen that by this construction I have what may be called a "self-contained" motor, carrying the bearings for the motor-shaft and also the bearings for the driven shaft, the whole being supported upon a common base.

I have illustrated one form of my device in the drawings in order to make its application clear; but it is, of course, evident that the various parts may be varied in form, construction, and arrangement without departing from the spirit of my invention, and I therefore do not wish to be limited in any manner by the construction shown.

Since the motor and driven shaft bearings constitute a unitary structure, and since the motor may be suspended or supported in any desired position, and since, further, it often happens that the relative position of the point of support and the driven shaft varies in different applications of the motor, it is desirable to provide some simple and convenient means of adjusting the relative position of these parts. In order to provide for this adjustment, the end pieces B and C are connected to the central piece A by suitable bolts or the like, as shown, and these bolts are preferably spaced equally. By this construction the end pieces may be rotated, as it were, about the armature-shaft so as to vary or adjust the position of the bearings $B^2$ and $C^2$, and hence the position of the driven shaft D, with relation to the point of support of the motor. When the holes for the bolts are equally spaced, it will be seen that when one of the end pieces is rotated a distance equal to the distance between any two bolts the bolt-holes in the end piece will be in position to receive the bolts, thus providing an easy means of adjusting the relative position of the two shafts when such adjustment is desirable or necessary. It is, of course, evident that the range of adjustment can be varied by varying the number of bolts used. It will further be seen that this adjustment of the bearings of the driven shaft in no manner affects the alinement or proper relation between the two sets of bearings.

The use and operation of my invention will be readily seen from the foregoing description. By this construction I obtain what may be called a "self-contained" motor, carrying the driving or motor shaft and the driven shaft. The bearings for the driving-shaft when constructed in this manner need no additional standards or supports and may be constructed so as to be similar in all respects to the bearings of the motor-shaft. This construction also provides a convenient means for connecting a high-speed motor by means of gearing to a driven shaft so as to drive said driven shaft at a slow rate of speed. The motor when constructed in the manner shown can be set up in the same manner and with no greater difficulty than when the ordinary motor is used. This construction also allows the motor to be suspended from the ceiling or from a side wall or post and has many advantages which will readily occur to the users of such machines. By having upon each of these end pieces the two bearings, one for the motor-shaft and the other for the driven shaft, it is evident that when the two end pieces have been brought into proper relation and attached at their proper positions to the central frame-piece, the bearings will be in proper alinement for both of the shafts. With a device constructed as here illustrated if the motor is to be applied to the driving-shaft it is only necessary to insert that shaft, and it may be a line or counter shaft or fixed in position into the bearing, and then the motor can be swung around until some point has been found to which the piece can be attached, whereupon, if there attached, everything is in proper condition to run. By this kind of a construction it is evident, therefore, that the difficulties in bringing the bearings for the driving-shaft and the motor-shaft in the proper relative position is avoided and the motor can be applied with great ease to drive a shaft which is already supported in its proper hangers.

When it is desired to change the position of the driven shaft with relation to the point of support of the motor, the end pieces or removable heads B C are changed in position. This result is obtained by removing the bolts which connect the head or end pieces to the central piece A and then moving said end pieces to the desired position—as shown, for example, by dotted lines, Fig. 1—the bolts being replaced when the parts are properly adjusted. Since the bolts and bolt-holes are equally spaced, it will be seen that the head or end pieces may be moved to any position where the bolt-holes associated with it register with the bolt-holes in the center pieces. It will further be seen that this adjustment may be controlled by varying the number of bolts used to hold the end pieces in position.

I claim—

1. In a self-contained motor, the combination of a base, having means for attaching it fixedly in position, with a metallic shell attached thereto, two end pieces removably attached to the shell and having each an armature-shaft bearing in line with the axis of the shell and a lateral projection, bearings in said lateral projection, an armature within the shell, a supporting-shaft therefor in the bearings, an exterior shaft supported in the bearings which project laterally from the end pieces, and driving connections associated together and attached respectively to the outer ends of said shafts, substantially as shown and described.

2. In a self-contained motor, the combination of a base, having means for attaching it fixedly in position, with a metallic shell attached thereto, two end pieces removably attached to the shell by devices which permit the two end pieces to be adjusted in position so as to vary the position of the exterior shaft without disturbing the parallelism of the two shafts, said end pieces having each an armature-shaft bearing in line with the axis of the shell and a lateral projection, bearings in said lateral projection, an armature within the shell, a supporting-shaft therefor in the bearings, an exterior shaft supported in the bearings which project laterally from the end pieces, and driving connections associated together and attached respectively to the outer ends of said shafts, substantially as shown and described.

3. In a self-contained motor, the combination of a base having means for fixing it in position, with a frame adapted to be attached to the base, an armature and armature-shaft within the frame, a second shaft exterior to the frame, two end pieces, having each a bearing for the armature-shaft and a lateral projecting bearing for the exterior shaft, and means for attaching said end pieces to the frame so as to permit of the adjustment of the exterior shaft about the frame without disturbing its parallelism with the armature-shaft.

4. An electric motor having a counter-shaft geared to its armature, and means for angularly shifting said counter-shaft to different positions around said armature-shaft.

5. An electric motor having a counter-shaft geared to its armature-shaft, and bearings for said counter-shaft angularly movable around said armature-shaft.

6. An electric motor having a frame provided with rotatable heads, and a counter-shaft carried by said heads.

7. An electric motor having a frame provided with rotatable heads having lateral projections, and a counter-shaft journaled in said projections.

8. An electric motor having a cylindrical magnet-frame, a rotatable head on each end of said frame, fastening-bolts spaced at equal distances, and a counter-shaft carried by said heads.

9. An electric motor having a frame provided with heads rotatable on the armature-shaft, and a counter-shaft carried by said heads and geared to the armature-shaft.

10. An electric motor having a cylindrical magnet-frame, circular heads rotatable on the ends of said frame, armature-shaft bearings at the centers of said heads, lateral projections on said heads, and a counter-shaft journaled in said projection.

11. In a dynamo-electric machine, having an armature-shaft, a counter-shaft, means for transmitting motion between the shafts, and means for angularly shifting said shafts with respect to each other.

12. In combination, a frame for a dynamo-electric machine, a pair of angularly-adjustable heads therefor, each head containing an armature and a counter-shaft bearing, a counter-shaft, and means for adjusting both of the heads to corresponding points so that the parallelism of the two shafts will be maintained.

13. The combination with an electric machine, of a back-gearing device therefor adjustable in relation thereto.

14. The combination of an electric machine and a back-gearing device therefor having a back-gear axle adjustable in position relative to the axis of the armature of said machine.

15. The combination of an electric machine, a back-gear actuated by said machine, a shaft or axle for said gear and brackets having bearings for said axle and secured to but capable of adjustment on said machine.

EDGAR G. RICHARDS,

Witnesses:
F. L. STAGG,
AUG. J. BUENZLI.